(12) United States Patent
Mouri et al.

(10) Patent No.: US 10,023,102 B2
(45) Date of Patent: Jul. 17, 2018

(54) VEHICULAR HEADLAMP

(71) Applicants: TOYOTA JIDOSHA KABUSHIKI KAISHA, Toyota-shi (JP); KOITO MANUFACTURING CO., LTD., Minato-ku (JP)

(72) Inventors: Fumihiko Mouri, Owariasahi (JP); Yusuke Nakada, Shizuoka (JP); Yoshiyuki Nakanishi, Shizuoka (JP)

(73) Assignees: TOYOTA JIDOSHA KABUSHIKI KAISHA, Toyota-shi (JP); KOITO MANUFACTURING CO., LTD., Minato-ku (JP)

(*) Notice: Subject to any disclaimer, the term of this patent is extended or adjusted under 35 U.S.C. 154(b) by 0 days.

(21) Appl. No.: 15/339,365

(22) Filed: Oct. 31, 2016

(65) Prior Publication Data

US 2017/0136939 A1 May 18, 2017

(30) Foreign Application Priority Data

Nov. 12, 2015 (JP) .................................. 2015-222269

(51) Int. Cl.
*B60Q 1/076* (2006.01)
*F21S 8/10* (2006.01)
(Continued)

(52) U.S. Cl.
CPC ............ *B60Q 1/076* (2013.01); *F21S 41/285* (2018.01); *F21S 41/39* (2018.01); *F21S 45/47* (2018.01);
(Continued)

(58) Field of Classification Search
CPC .. F21S 48/1225; F21S 48/1305; F21S 48/328; F21S 48/1757; B60Q 1/076
See application file for complete search history.

(56) References Cited

U.S. PATENT DOCUMENTS

2007/0147058 A1* 6/2007 Futami ................. B60Q 1/0041
362/509
2009/0290372 A1* 11/2009 Kotajima ............. F21S 48/1159
362/539
(Continued)

FOREIGN PATENT DOCUMENTS

DE   10 2009 021 046 A1   12/2009
EP      2 706 287 A2       3/2014
(Continued)

*Primary Examiner* — Alexander Garlen
(74) *Attorney, Agent, or Firm* — Oblon, McClelland, Maier & Neustadt, L.L.P.

(57) ABSTRACT

A vehicular headlamp includes: a first light distribution portion including a first light source; a second light distribution portion including a second light source and an micro electro mechanical system mirror; a holding member configured to hold the first light source, the second light source, and the micro electro mechanical system mirror; a single lens including a first lens portion and a second lens portion; and a separating wall formed in the holding member so as to protrude toward the vehicle front side relative to the holding member, the separating wall being configured to separate a region between the first lens portion and the holding member from a region between the second lens portion and the holding member.

9 Claims, 5 Drawing Sheets

(51) Int. Cl.
　　　*F21V 14/04*　　　(2006.01)
　　　*F21S 41/20*　　　(2018.01)
　　　*F21S 45/47*　　　(2018.01)
　　　*F21S 41/39*　　　(2018.01)

(52) U.S. Cl.
　　　CPC ....... *F21S 48/1225* (2013.01); *F21S 48/1305* (2013.01); *F21S 48/328* (2013.01); *F21V 14/04* (2013.01)

(56) References Cited

U.S. PATENT DOCUMENTS

| | | | |
|---|---|---|---|
| 2011/0249460 A1* | 10/2011 | Kushimoto | B60Q 1/085 362/510 |
| 2015/0092435 A1* | 4/2015 | Yamamura | B60Q 1/0005 362/512 |
| 2015/0191115 A1* | 7/2015 | Yamamura | F21S 48/1154 315/82 |
| 2016/0039286 A1* | 2/2016 | Shibata | B60K 35/00 701/36 |
| 2016/0195232 A1* | 7/2016 | Boinet | F21S 48/1225 362/510 |

FOREIGN PATENT DOCUMENTS

| | | |
|---|---|---|
| JP | 2009-283408 A | 12/2009 |
| JP | 2010-36835 A | 2/2010 |
| JP | 2015-38885 | 2/2015 |
| JP | 2015-137031 A | 7/2015 |

\* cited by examiner

VEHICULAR HEADLAMP

INCORPORATION BY REFERENCE

The disclosure of Japanese Patent Application No. 2015-222269 filed on Nov. 12, 2015 including the specification, drawings and abstract is incorporated herein by reference in its entirety.

BACKGROUND

1. Technical Field

The present disclosure relates to a vehicular headlamp.

2. Description of Related Art

A vehicular headlamp described in Japanese Patent Application Publication No. 2015-38885 (JP 2015-38885 A) includes a fixed light distribution unit and a variable light distribution unit. On this account, the variable light distribution unit can form various light distribution patterns and project light with the light distribution patterns toward a vehicle front side.

SUMMARY

However, in the vehicular headlamp of the related art, the fixed light distribution unit and the variable light distribution unit formed separately are arranged side by side in a vehicle up-down direction. This causes a problem of upsizing of the vehicular headlamp. In this regard, in order to restrain the upsizing of the vehicular headlamp, it is conceivable that the fixed light distribution unit and the variable light distribution unit are integrated. However, in this case, a lens is constituted by a single lens. As a result, light projected by the fixed light distribution unit may pass through the lens on a variable-light-distribution-unit side, and light projected by the variable light distribution unit may pass through the lens on a fixed-light-distribution-unit side. This may make it difficult to perform light distribution in each unit appropriately.

The present disclosure provides a vehicular headlamp that can distribute light appropriately while restraining upsizing.

A vehicular headlamp according to a first aspect of the present disclosure includes: a first light distribution portion including a first light source, the first light distribution portion being configured to distribute, toward a vehicle front side, light projected by the first light source; a second light distribution portion including a second light source and an micro electro mechanical system mirror, the second light distribution portion being configured to distribute light toward the vehicle front side with a predetermined light distribution pattern by reflecting, by the micro electro mechanical system mirror, light projected by the second light source; a holding member configured to hold the first light source, the second light source, and the micro electro mechanical system mirror; a single lens including a first lens portion and a second lens portion, the first lens portion being constituting a vehicle-front-side portion of the first light distribution portion and configured such that the light projected by the first light source is passed through the first lens portion, and the second lens portion being constituting a vehicle-front-side portion of the second light distribution portion and configured such that the light reflected by the micro electro mechanical system mirror is passed through the second lens portion; and a separating wall formed in the holding member so as to protrude toward the vehicle front side relative to the holding member, the separating wall being configured to separate a region between the lens and the holding member in the first light distribution portion from a region between the lens and the holding member in the second light distribution portion.

In the vehicular headlamp configured as described above, the first light source, the second light source, and the micro electro mechanical system mirror are held by the holding member, and the vehicle-front-side portions of the first light distribution portion and the second light distribution portion are constituted by the single lens. This allows the first light distribution portion and the second light distribution portion to be integrated with each other. Accordingly, it is possible to restrain upsizing of the vehicular headlamp.

Besides, the separating wall protruding toward the vehicle front side is formed in the holding member. The region between the lens and the holding member in the first light distribution portion is separated by the separating wall from the region between the lens and the holding member in the second light distribution portion. On this account, the separating wall functions as a light shielding portion that shields the light projected by the first light source and the light reflected by the micro electro mechanical system mirror. Accordingly, it is possible to restrain the light projected by the first light source from passing through a part constituting the second light distribution portion of the lens (the second lens portion), and it is also possible to restrain the light reflected by the micro electro mechanical system mirror from passing through a part constituting the first light distribution portion of the lens (the first lens portion). Accordingly, it is possible to restrain upsizing of the vehicular headlamp and to perform appropriate light distribution in the first light distribution portion and the second light distribution portion.

In the above aspect, the lens may include a recessed portion formed on a rear face of the lens such that the recessed portion is opened toward a vehicle rear side, and a front end of the separating wall may be placed inside the recessed portion.

In the vehicular headlamp of the above aspect, it is possible to place the front end of the separating wall on the vehicle front side relative to a rear end of the lens. This makes it possible to further restrain the light projected by the first light source from passing through the second lens portion, and to further restrain the light reflected by the micro electro mechanical system mirror from passing through the first lens portion. Accordingly, it is possible to enhance a light shielding effect by the separating wall still more.

In the above aspect, a surface of the separating wall on a side of the second light distribution portion may be a light absorption portion configured to absorb the light reflected by the micro electro mechanical system mirror.

In the vehicular headlamp of the above aspect, off-light reflected by the micro electro mechanical system mirror (light reflected by micromovable mirrors constituting the micro electro mechanical system mirror in an OFF state) can be absorbed by the light absorption portion.

In the above aspect, the holding member may be provided as a heat sink configured to dissipate heat generated by the first light source and the second light source.

In the vehicular headlamp of the above aspect, the holding member is caused to function as the heat sink, so that the heat sink is used commonly by the first light distribution portion and the second light distribution portion.

In the above aspect, the first light distribution portion and the second light distribution portion may be arranged in a vehicle up-down direction, and the second light distribution portion may be placed on a vehicle lower side relative to the first light distribution portion.

In the vehicular headlamp of the above aspect, even in a case where the first light distribution portion and the second light distribution portion are arranged in the vehicle up-down direction, it is possible to provide the vehicular headlamp in a vehicle while restraining upsizing of a front portion of the vehicle in the vehicle up-down direction, for example. That is, since the second light distribution portion is configured such that the light from the second light source is reflected by the micro electro mechanical system mirror, a space in which to place the second light distribution portion becomes larger than a space in which to place the first light distribution portion. In the meantime, generally, in the front portion of the vehicle, a bumper cover is provided on the vehicle lower side relative to the lens of the vehicular headlamp, and a hood is provided on the vehicle upper side relative to the lens. On this account, by placing the second light distribution portion on the lower side relative to the first light distribution portion, it is possible to configure the second light distribution portion to have a layout in which the second light source is placed on the vehicle rear side relative to the bumper cover. This accordingly makes it possible to provide the vehicular headlamp in the vehicle while restraining upsizing of the front portion of the vehicle in the vehicle up-down direction, for example.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

A vehicular headlamp 10 according to the present embodiment is described below with reference to the drawings. Note that an arrow UP and an arrow FR illustrated in the drawings indicate a vehicle upper side and a vehicle front side of a vehicle V to which the vehicular headlamp 10 is applied, respectively, and an arrow RH illustrated in the drawings indicates a vehicle right side in a state where the vehicle V faces a travelling direction. Hereinafter, in a case where a description is made by use of merely an up-down direction, a front-rear direction, and a right-left direction, they indicate up and down of a vehicle up-down direction, front and rear of a vehicle front-rear direction, and right and left in a vehicle right-left direction (a vehicle width direction), respectively, unless otherwise specified.

Figure 1:
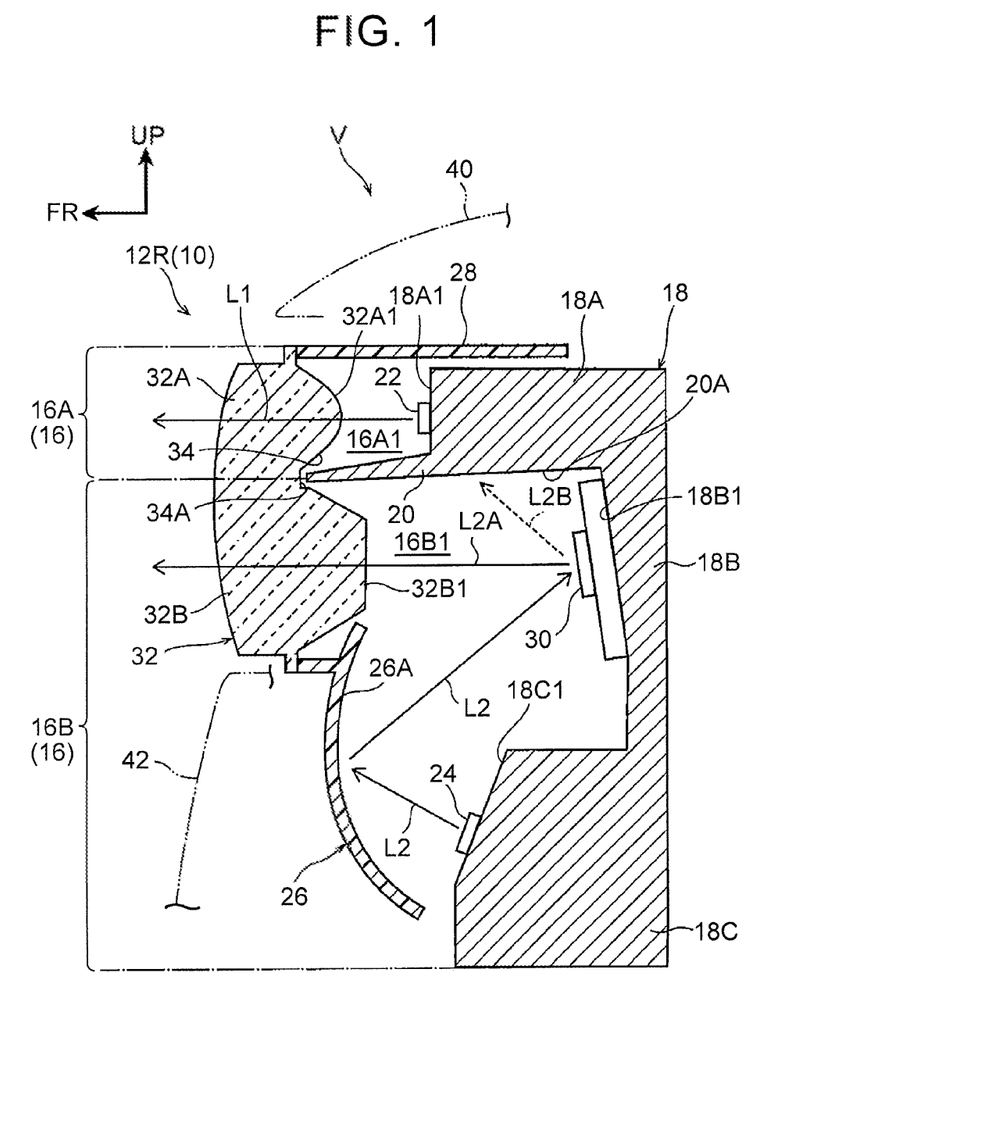
FIG. 1 is a sectional view (an enlarged sectional view taken along a line I-I in FIG. 2) of a high-beam unit on a vehicle right side in a vehicular headlamp according to the present embodiment, when viewed from a central side in a vehicle width direction.
Figure 2:
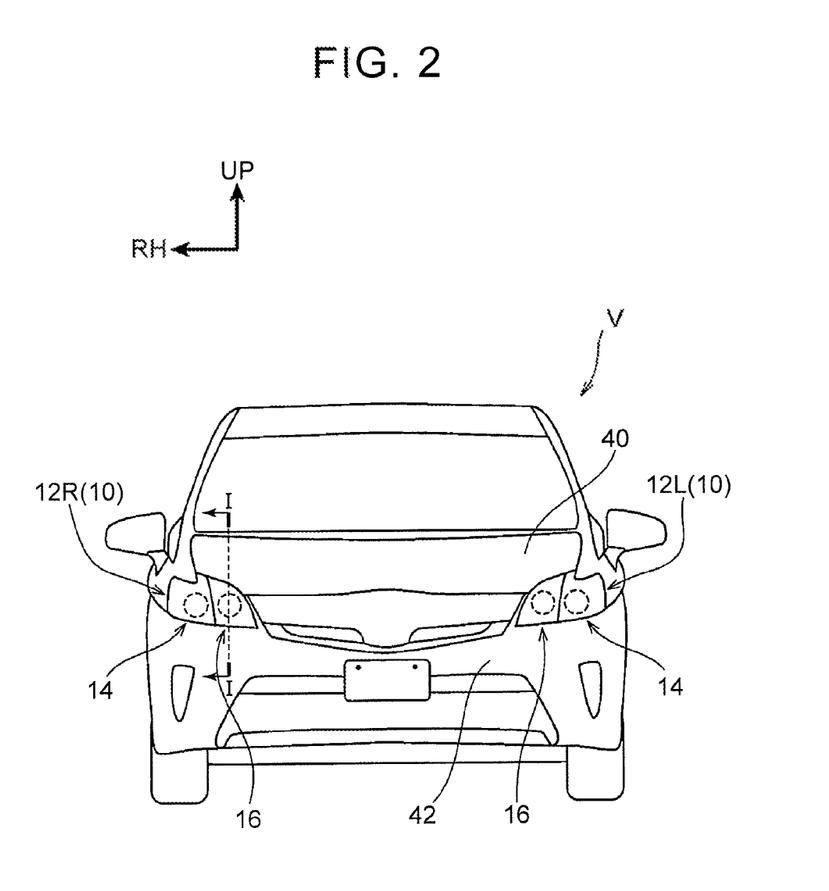
FIG. 2 is a front view illustrating a front portion of a vehicle to which the vehicular headlamp according to the present embodiment is applied.

As illustrated in FIG. 2, the vehicular headlamp 10 includes a pair of head lamp units 12R, 12L on right and left sides. The head lamp unit 12R is placed in a right end of a front portion of the vehicle V, and the head lamp unit 12L is placed in a left end of the front portion of the vehicle V. Further, as illustrated in FIG. 1, a front end of a hood 40 for opening and closing an engine compartment of the vehicle V is placed above the head lamp units 12R, 12L. Further, lower portions of the after-mentioned high-beam units 16 of the head lamp units 12R, 12L are covered with a bumper cover 42 constituting the front portion of the vehicle V from a front side. The head lamp units 12R, 12L are configured symmetrically on right and left sides in the vehicle width direction. In view of this, the following description deals with the head lamp unit 12R on the right side, and the description of the head lamp unit 12L on the left side is omitted.

As illustrated in FIG. 2, the head lamp unit 12R includes a low-beam unit 14 constituting a vehicle-width outer part of the head lamp unit 12R, and a high-beam unit 16 constituting a vehicle-width inner part of the head lamp unit 12R.

The low-beam unit 14 has a light source (not show), and is configured to mainly irradiate a road surface in front of the vehicle V by the light source. More specifically, the low-beam unit 14 is configured to mainly irradiate the road surface on the front side relative to the vehicle V (see a low-beam light distribution area illustrated in FIGS. 3 and 4).

Figure 3:
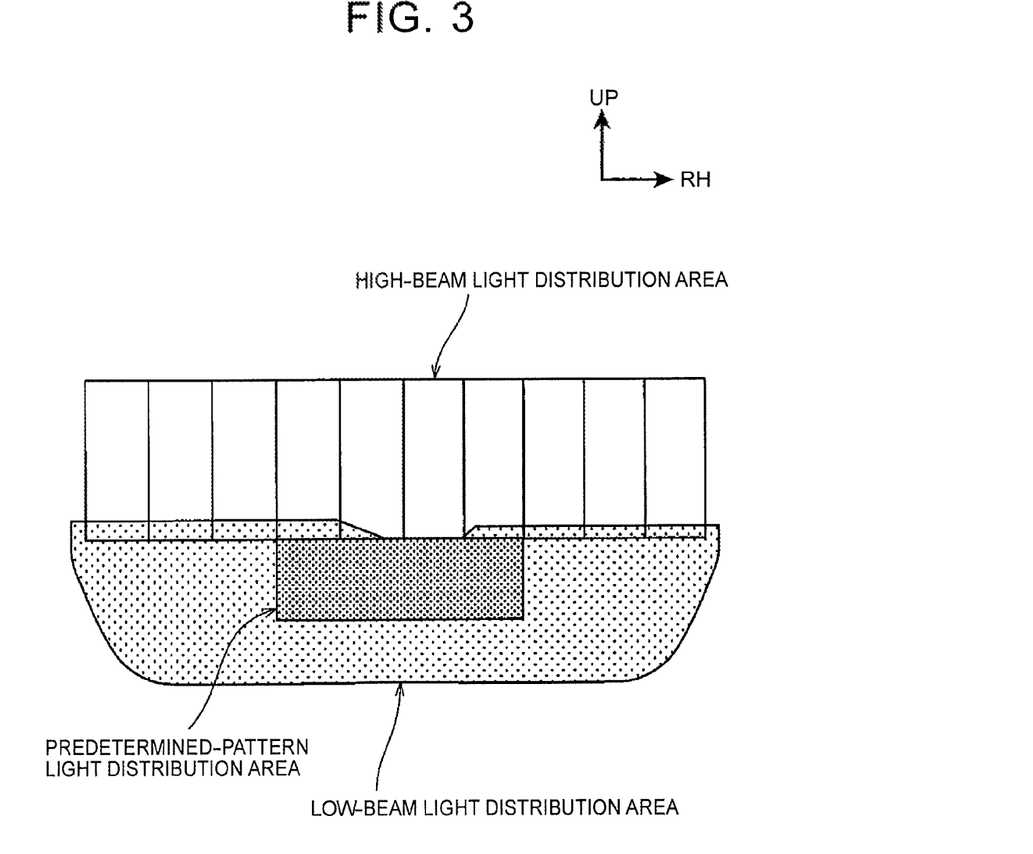
FIG. 3 is an explanatory view to describe one example of a light distribution area of the vehicular headlamp illustrated in FIG. 2.
Figure 4:
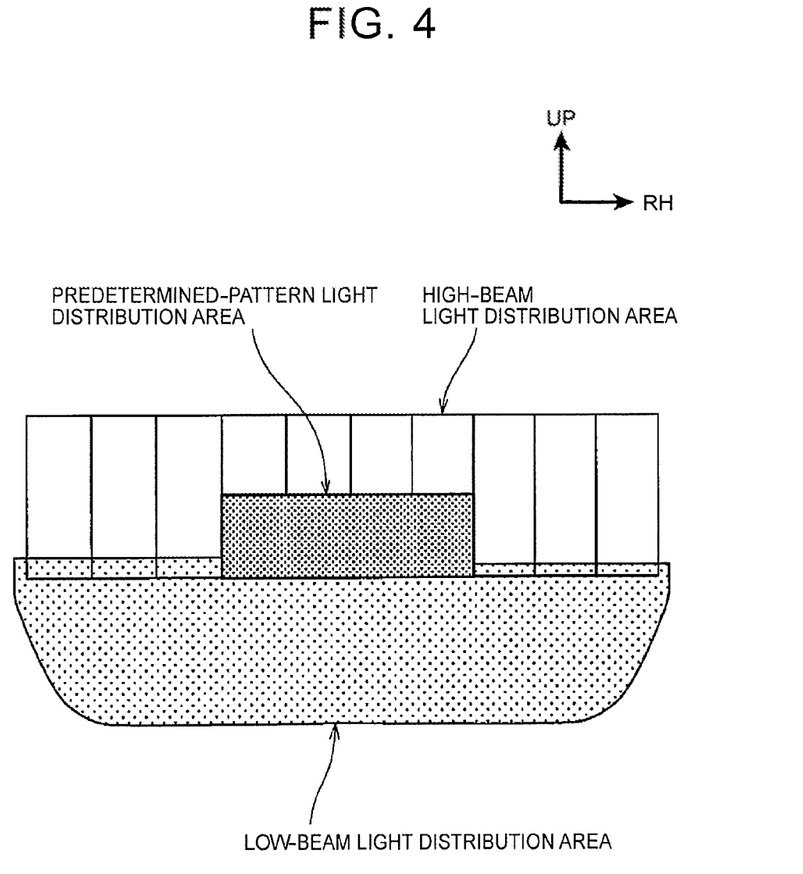
FIG. 4 is an explanatory view to describe another example of the light distribution area of the vehicular headlamp illustrated in FIG. 2.

As illustrated in FIG. 1, the high-beam unit 16 includes a first light distribution portion 16A constituting an upper end of the high-beam unit 16, and a second light distribution portion 16B placed adjacent to a lower side of the first light distribution portion 16A. The high-beam unit 16 is provided as a unit in which the first light distribution portion 16A and the second light distribution portion 16B are integrated. As illustrated in FIGS. 3, 4, the first light distribution portion 16A distributes light to a region (a high-beam light distribution area illustrated in FIGS. 3 and 4) on an upper side relative to the low-beam light distribution area irradiated by the low-beam unit 14. Further, the second light distribution portion 16B distributes light with a predetermined light distribution pattern to a region (see a predetermined pattern light distribution area illustrated in FIGS. 3 and 4) that is smaller than the high-beam light distribution area. The following describes the high-beam unit 16, more specifically.

As illustrated in FIG. 1, the high-beam unit 16 includes a heat sink 18 as a "holding member" constituting a rear end of the high-beam unit 16. The heat sink 18 is provided as a single member used commonly in the first light distribution portion 16A and the second light distribution portion 16B. Further, the heat sink 18 is provided as a heat dissipation member that dissipates heat generated by a first light source 22 and a second light source 24, which will be describe later, and the heat sink 18 is made of aluminum alloy, and the like.

The heat sink 18 is formed in a substantially U-shaped block shape opened forward in a side view, and is fixed to a vehicle body at a position (not shown). That is, the heat sink 18 is configured such that an upper end and a lower end thereof overhang forward relative to a intermediate portion 18B of the heat sink 18 in the up-down direction. A part overhanging forward in the upper end of the heat sink 18 is an upper overhanging portion 18A, and the upper overhanging portion 18A constitutes a rear end of the first light distribution portion 16A. Further, a part overhanging forward in the lower end of the heat sink 18 is a lower overhanging portion 18C, and the intermediate portion 18B and the lower overhanging portion 18C of the heat sink 18 constitute a rear end of the second light distribution portion 16B.

A front surface of the upper overhanging portion 18A is an upper holding surface 18A1 for holding (fixing) the after-mentioned first light source 22, and the upper holding surface 18A1 is placed along a surface perpendicular to the front-rear direction. Further, a lower holding surface 18C1 for holding (fixing) the after-mentioned second light source 24 is formed in an upper part on a front surface of the lower overhanging portion 18C. The lower holding surface 18C1 is placed on a rear side relative to the upper holding surface 18A1 and is inclined rearward as it goes upward in a side view. Further, a mirror holding surface 18B1 for holding (fixing) the after-mentioned MEMS mirror 30 is formed on a front surface of the intermediate portion 18B of the heat sink 18. The mirror holding surface 18B1 is placed on the rear sider relative to the upper holding surface 18A1 and the lower holding surface 18C1 and is slightly inclined forward as it goes upward in a side view.

Further, a light shielding wall 20 as "a separating wall" is formed integrally with a lower end of the upper overhanging portion 18A of the heat sink 18. The light shielding wall 20 protrudes forward relative to the upper holding surface 18A1 with its plate-thickness direction being substantially along the up-down direction. More specifically, a top face of the light shielding wall 20 is extended forward from a lower end of the upper overhanging portion 18A. Further, a lower face (a surface on a side of second light distribution portion 16B of the light shielding wall 20 constitutes a lower face of the upper overhanging portion 18A and is extended forward from an upper end of the mirror holding surface 18B1. Hereby, the light shielding wall 20 is configured to separate the first light distribution portion 16A from the second light distribution portion 16B in the up-down direction. Further, a lower face of the light shielding wall 20 is slightly inclined downward as it goes forward in a side view.

The first light source 22 constituting the first light distribution portion 16A is held by (fixed to) the upper holding surface 18A1, and the first light source 22 is placed on the rear side relative to a distal end (a front end) of the light shielding wall 20. In other words, the light shielding wall 20 and the first light source 22 are placed so as to overlap each other in the up-down direction. The first light source 22 is provided as an LED array. That is, the first light source 22 includes a plurality of light emitting diodes (LEDs) as light-emitting elements, and the light emitting diodes (LEDs) are arranged side by side in the vehicle width direction. Light L1 emitted from the first light source 22 is projected forward and passed through the after-mentioned lens 32 so as to be distributed to the high-beam light distribution area.

Further, the first light source 22 is electrically connected to a controlling portion (not shown), and the plurality of light emitting diodes each emits light by a control of the controlling portion. More specifically, as illustrated in FIG. 3, the first light distribution portion 16A is configured to distribute light by dividing the high-beam light distribution area in the vehicle width direction. That is, by controlling the plurality of light emitting diodes independently in the first light distribution portion 16A, the light distribution in the high-beam light distribution area can be controlled. Further, the first light distribution portion 16A is provided with a shielding portion (not shown), so that the shielding portion can shield the light emitted from the plurality of light emitting diodes. Hereby, as illustrated in FIG. 4, areas of divided light distribution patterns are changeable by the shielding portion (FIG. 4 illustrates an example in which a lower part of the high-beam light distribution area on a central side in the vehicle width direction is shielded by the shielding portion).

In the meantime, as illustrated in FIG. 1, the second light distribution portion 16B includes the second light source 24, a reflecting mirror 26, and a micro electro mechanical system (MEMS) mirror 30. The second light source 24 is provided as a high-luminance light source such as a light emitting diode (LED), a laser diode (LD), a halogen lamp, and a high intensity discharge lamp (HID). Further, the second light source 24 is held by (fixed to) the lower holding surface 18C1 of the heat sink 18. As described above, the lower holding surface 18C1 is inclined rearward as it goes upward in a side view. Accordingly, light L2 emitted from the second light source 24 is projected forward and diagonally upward, and then incident on the after-mentioned reflecting mirror 26.

The reflecting mirror 26 is provided on the front side relative to the second light source 24 and is covered with the bumper cover 42 of the vehicle V from the front side. The reflecting mirror 26 is formed in a plate shape curved forward in a protruding manner. Further, a rear face of the reflecting mirror 26 serves as a reflecting surface 26A, and the reflecting surface 26A is formed in a recessed curved shape opened rearward. The light L2 emitted from the second light source 24 is reflected rearward and diagonally upward by the reflecting surface 26A, so that the light L2 thus reflected is incident on the after-mentioned MEMS mirror 30.

Further, a lens hold portion 28 for holding the after-mentioned lens 32 is formed integrally on an upper side of the reflecting mirror 26. The lens hold portion 28 is formed in a substantially tubular shape with its axial direction being along the front-rear direction, and a lower part of a front end of the lens hold portion 28 is connected to an upper front part of the reflecting mirror 26. Further, a rear part (a part except the front end) of the lens hold portion 28 is opened downward, so that the light L2 reflected by the aforementioned reflecting mirror 26 is incident on the after-mentioned MEMS mirror 30 without interfering with the lens hold portion 28. Note that the lens hold portion 28 is fixed to the heat sink 18 at a position that is not illustrated herein.

The MEMS mirror 30 is held by (fixed to) the mirror holding surface 18B1 of the aforementioned heat sink 18 and is placed on the rear side relative to the distal end (the front end) of the light shielding wall 20. The MEMS mirror 30 is constituted by a plurality of micromovable mirrors arranged two-dimensionally, and each of the plurality of micromovable mirrors is formed on a semiconductor substrate by a semiconductor process. Further, a controlling portion (not shown) is electrically connected to the MEMS mirror 30, so that the micromovable mirrors are driven by a control of the controlling portion. When the micromovable mirrors are driven by the control of the controlling portion, angles of respective reflecting surfaces of the micromovable mirrors are changed, so that the micromovable mirrors enter an ON state or an OFF state. More specifically, when the micromovable mirrors enter the ON state, the light L2 incident on the micromovable mirrors from the reflecting mirror 26 is reflected by the micromovable mirrors (hereinafter the light thus reflected is referred to as "on-light L2A"), and the on-light L2A is projected forward from the MEMS mirror 30. In the meantime, when the micromovable mirrors enter the OFF state, the light L2 incident on the micromovable mirrors from the reflecting mirror 26 is reflected by the micromovable mirrors (hereinafter the light thus reflected is referred to as "off-light L2B"), and the off-light L2B is projected forward and diagonally upward from the MEMS mirror 30, so that the lower face of the aforementioned light shielding wall 20 is irradiated with the off-light L2B.

As described above, the second light distribution portion 16B is configured such that the second light source 24 is placed on the lower side relative to the MEMS mirror 30, so that the light L2 emitted from the second light source 24 is guided upward by the reflecting mirror 26. Further, the second light distribution portion 16B is configured such that, by means of the on-light L2A reflected forward by the MEMS mirror 30, light with a predetermined light distribution pattern is projected in front of the vehicle V. For example, as illustrated in FIG. 3, the low-beam light distribution area is irradiated with light with a predetermined pattern (e.g., an arrow indicative of a travelling direction of the vehicle V, and the like). Further, for example, as illustrated in FIG. 4, a central region of the high-beam light distribution area in the width direction is irradiated by the second light distribution portion 16B.

Further, the lower face of the light shielding wall 20 in the aforementioned heat sink 18 is a light absorption portion 20A, and black coating is performed on the light absorption portion 20A. Hereby, the off-light L2B applied to the lower face (the light absorption portion 20A) of the light shielding wall 20 is absorbed by the light absorption portion 20A of the light shielding wall 20. Note that a method for absorbing the off-light L2B by the light absorption portion 20A of the light shielding wall 20 is not limited to this. For example, a black anodizing aluminum process may be performed on a surface of the heat sink 18, so that the off-light L2B is absorbed by the light absorption portion 20A of the light shielding wall 20. Further, in a case where coating is performed on the light absorption portion 20A of the light shielding wall 20, the coating is not limited to black, but may be a color that can absorb the off-light L2B. Further, for example, a surface of the light absorption portion 20A of the light shielding wall 20 may be roughened (e.g., a wrinkle pattern may be formed on the light absorption portion 20A of the light shielding wall 20), so as to scatter the off-light L2B incident on the light absorption portion 20A of the light shielding wall 20. On this account, a "light absorption portion" in the present disclosure indicates a part on which the coating, the anodizing aluminum process, or the like is performed, in the lower face of the light shielding wall 20.

Further, the high-beam unit 16 includes the lens 32 constituting a front end of the high-beam unit 16. The lens 32 is placed on the front side relative to the first light source 22 and the MEMS mirror 30, and is provided as a single lens used commonly in the first light distribution portion 16A and the second light distribution portion 16B. The lens 32 is held by the lens hold portion 28 in a state where a rear part of the lens 32 is accommodated inside the front end of the lens hold portion 28. Hereby, the bumper cover 42 of the vehicle V is placed on the lower side relative to the lens 32, and the hood 40 of the vehicle V is placed on the upper side relative to the lens 32.

Further, a front surface of the lens 32 is curved so as to protrude forward in a side view from a lower end of the lens 32 to an upper end thereof. In the meantime, a recessed portion 34 having a substantially V-shape opened rearward in a side view is formed in an intermediate part of a rear face of the lens 32 in the up-down direction. An upper part relative to a bottom face 34A of the recessed portion 34 in the lens 32 is an upper lens portion (a first lens portion) 32A.

The upper lens portion 32A is placed on the front side relative to the first light source 22 and is provided as a lens for the first light distribution portion 16A. Further, a rear face of the upper lens portion 32A is formed as an upper protruding surface 32A1 protruding rearward relative to the bottom face 34A of the recessed portion 34, and the upper protruding surface 32A1 is formed in a curved shape protruding rearward in a side view. Hereby, the light L1 projected forward by the first light source 22 is collected by the upper protruding surface 32A1, and then, the light L1 passes through the upper lens portion 32A so as to be projected toward the front side relative to the vehicle V.

In the meantime, a lower part of the lens 32 relative to the bottom face 34A of the recessed portion 34 is a lower lens portion 32B. The lower lens portion (a second lens portion) 32B is placed on the front side relative to the MEMS mirror 30 and is provided as a lens for the second light distribution portion 16B. A rear face of the lower lens portion 32B is formed as a lower protruding surface 32B1 protruding rearward relative to the bottom face 34A of the recessed portion 34, and the lower protruding surface 32B1 is formed in a substantially U-shape (as a protruding surface that protrudes rearward) opened forward in a side view. Hereby, the on-light L2A reflected forward by the MEMS mirror 30 is collected by the lower protruding surface 32B1, and then, the on-light L2A passes through the lower lens portion 32B so as to be projected toward the front side relative to the vehicle V.

Further, a protruding amount of the lower protruding surface 32B1 from the bottom face 34A of the recessed portion 34 is set to be larger than a protruding amount of the upper protruding surface 32A1 from the bottom face 34A of the recessed portion 34. Further, the front end (distal end) of the light shielding wall 20 in the aforementioned heat sink 18 is placed inside the recessed portion 34 of the lens 32. More specifically, a front end of the light shielding wall 20 is placed closer to the rear side of the bottom face 34A of the recessed portion 34, and is placed so as to be opposed to the bottom face 34A of the recessed portion 34 in the front-rear direction. On this account, a region between the upper lens portion 32A and the heat sink 18 (the upper overhanging portion 18A) in the first light distribution portion 16A (hereinafter, the region is referred to as a "first area 16A1") is separated by the light shielding wall 20 from a region between the lower lens portion 32B and the heat sink 18 (the intermediate portion 18B) in the second light distribution portion 16B (hereinafter, the region is referred to as a "second area 16B1"). In other words, in the up-down direction, the front end of the light shielding wall 20 and the upper protruding surface 32A1 are placed so as to overlap each other, and the front end of the light shielding wall 20 and the lower protruding surface 32B1 are placed so as to overlap each other. Hereby, the light shielding wall 20 restrains the light L1 projected by the first light source 22 from passing through the lower lens portion 32B of the lens 32, and the light shielding wall 20 restrains the light L2 (the on-light L2A and the off-light L2B) reflected by the MEMS mirror 30 from passing through the upper lens portion 32A of the lens 32.

Note that a predetermined gap is formed between the front end of the light shielding wall 20 and the bottom face 34A of the recessed portion 34, and the gap is set appropriately in consideration of assembly tolerance of components and so on. That is, from the viewpoint of enhancing a light shielding effect by the light shielding wall 20, it is desirable that the front end of the light shielding wall 20 abut with the bottom face 34A of the recessed portion 34. However, in consideration of the assembly tolerance and the like, a gap may be formed between the front end of the light shielding wall 20 and the bottom face 34A of the recessed portion 34. Hereby, a "separating wall configured to separate a region between a lens and a holding member in a first light distribution portion from a region between the lens and the holding member in a second light distribution portion" in the present disclosure includes a case where a gap is formed between the front end of the light shielding wall 20 and the bottom face 34A of the recessed portion 34. That is, the gap may be set to a dimension which can restrain the light L1 projected by the first light source 22 from passing through the lower lens portion 32B and which can restrain the light L2 reflected by the MEMS mirror 30 from passing through the upper lens portion 32A.

An operation and an effect of the present embodiment are described below.

The high-beam unit 16 in the vehicular headlamp 10, configured as described above, includes the first light distribution portion 16A having the first light source 22 provided as an LED array, and the second light distribution portion 16B having the second light source 24 and the MEMS mirror 30.

Here, the first light source 22, the second light source 24, and the MEMS mirror 30 are held by the heat sink 18. Further, front parts of the first light distribution portion 16A and the second light distribution portion 16B are constituted by the single lens 32. This allows the first light distribution portion 16A and the second light distribution portion 16B to be integrated with each other. This accordingly makes it possible to restrain upsizing of the vehicular headlamp 10 (the high-beam unit 16).

Besides, the heat sink 18 is provided with the light shielding wall 20 configured to separate the first area 16A1 of the first light distribution portion 16A from the second area 16B1 of the second light distribution portion 16B in the up-down direction. On this account, the light shielding wall 20 functions as a light shielding portion that shields the light L1 projected by the first light source 22 and the light L2 (the on-light L2A and the off-light L2B) reflected by the MEMS mirror 30. This makes it possible to restrain the light L1 projected by the first light source 22 from passing through the lower lens portion 32B of the lens 32, and also to restrain the light L2 (the on-light L2A and the off-light L2B) reflected by the MEMS mirror 30 from passing through the upper lens portion 32A of the lens 32. As a result, it is possible to restrain upsizing of the vehicular headlamp 10 (the high-beam unit 16) and to perform appropriate light distribution in the first light distribution portion 16A and the second light distribution portion 16B.

Further, the recessed portion 34 opened rearward in a side view is formed on the rear face of the lens 32, and the front end (distal end) of the light shielding wall 20 is placed inside the recessed portion 34. This makes it possible to place the front end of the light shielding wall 20 on the front side relative to the rear end of the lens 32. In other words, the upper protruding surface 32A1 and the lower protruding surface 32B1 constituting the rear face of the lens 32 provided as a single lens can be separated from each other in the up-down direction by the light shielding wall 20. This makes it possible to further restrain the light L1 projected by the first light source 22 from passing through the lower lens portion 32B of the lens 32, and also to further restrain the light L2 (the on-light L2A and the off-light L2B) reflected by the MEMS mirror 30 from passing through the upper lens portion 32A of the lens 32. Accordingly, it is possible to enhance the light shielding effect by the light shielding wall 20 still more.

Further, black coating is performed on the light absorption portion 20A of the light shielding wall 20. This allows the light absorption portion 20A of the light shielding wall 20 to absorb the off-light L2B reflected by the MEMS mirror 30. As a result, it is possible to restrain the off-light L2B reflected by the MEMS mirror 30 from reflecting diffusely in the second light distribution portion 16B.

Further, the heat sink 18 is made of aluminum alloy having a high coefficient of thermal conductivity, and the first light source 22 and the second light source 24 are held by (fixed to) the heat sink 18. Hereby, heat generated by the first light source 22 and the second light source 24 can be dissipated by the heat sink 18, and further, the heat sink 18 can be commonly used as a heat dissipating member in the first light distribution portion 16A and in the second light distribution portion 16B.

Further, in the high-beam unit 16, the first light distribution portion 16A and the second light distribution portion 16B are arranged in the up-down direction, and the second light distribution portion 16B is placed adjacent to the lower side of the first light distribution portion 16A. On this account, even in a case where the first light distribution portion 16A and the second light distribution portion 16B are arranged side by side in the up-down direction, it is possible to provide the vehicular headlamp 10 in the vehicle V while restraining upsizing of the front portion of the vehicle V in the up-down direction. That is, in the second light distribution portion 16B, the light L2 from the second light source 24 is guided upward by the reflecting mirror 26, so as to be reflected by the MEMS mirror 30. On this account, a space in which to place the second light distribution portion 16B in the up-down direction becomes larger than a space in which to place the first light distribution portion 16A. In the meantime, in the front portion of the vehicle V, the bumper cover 42 is provided on the lower side relative to the lens 32, and the hood 40 is provided on the upper side relative to the lens 32. Accordingly, by placing the second light distribution portion 16B on the lower side relative to the first light distribution portion 16A, it is possible for the second light distribution portion 16B to have a layout in which the second light source 24 is placed on the rear side relative to the bumper cover 42. This accordingly makes it possible to provide the vehicular headlamp 10 in the vehicle V while restraining upsizing of the front portion of the vehicle V in the up-down direction.

Further, the first light distribution portion 16A distributes, toward the front side relative to the vehicle V, the light L1 projected by the first light source 22 constituted by the LED array, and the second light distribution portion 16B distributes, toward the vehicle front side, the on-light L2A reflected by the MEMS mirror 30. Hereby, it is possible to distribute light to a wide area by the first light distribution portion 16A, and it is possible to distribute light with a predetermined pattern by the second light distribution portion 16B.

Further as described above, the first light source 22, the second light source 24, and the MEMS mirror 30 are held by (fixed to) the single heat sink 18. This makes it possible to restrain misalignment in the first light source 22, the second light source 24, and the MEMS mirror 30. In other words, it is possible to position the first light source 22, the second light source 24, and the MEMS mirror 30, appropriately. As a result, it is possible to successfully position the light L1 distributed by the first light distribution portion 16A and the light having a predetermined pattern and distributed by the second light distribution portion 16B.

Figure 5:
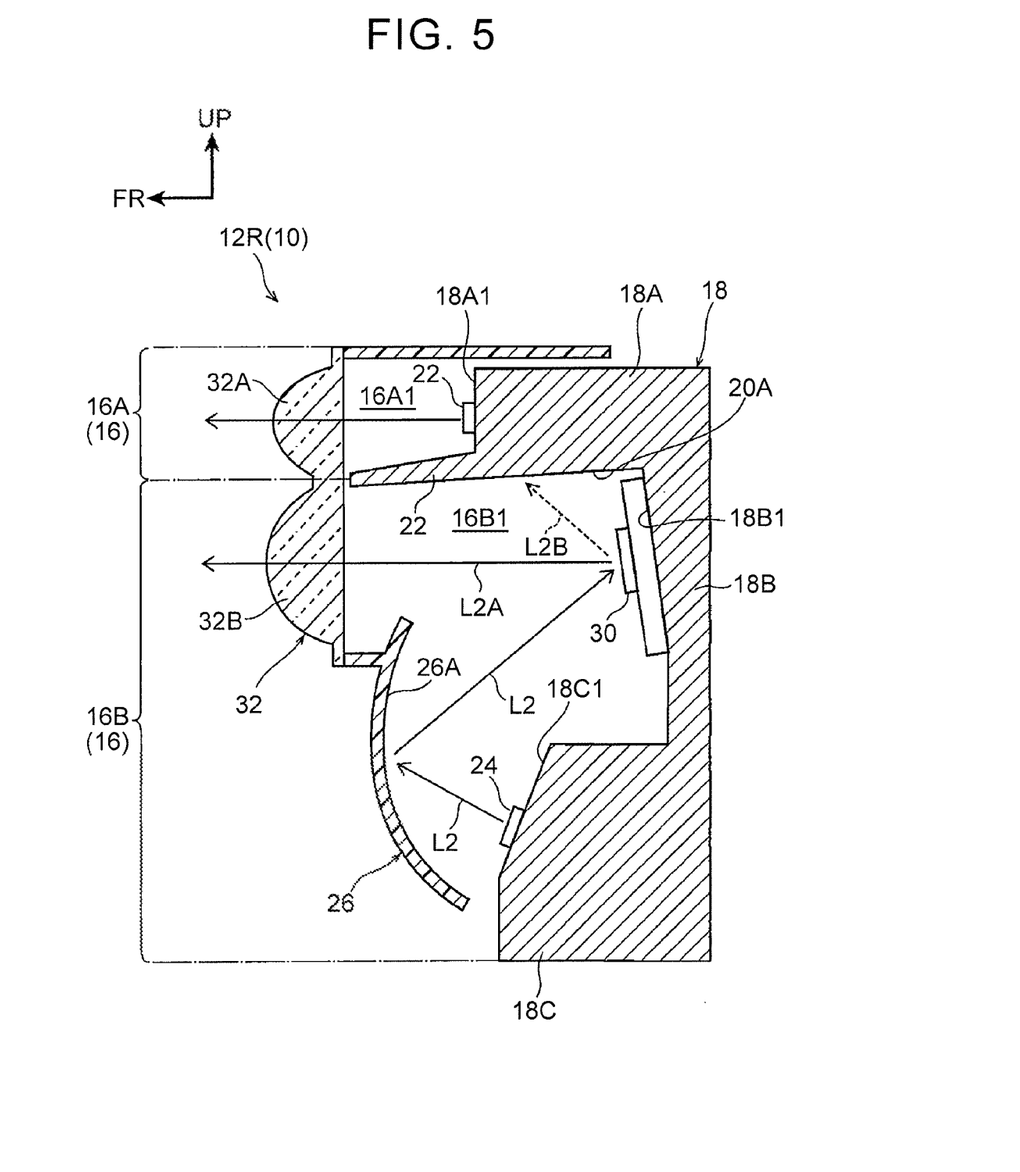
FIG. 5 is a sectional view corresponding to FIG. 1 and illustrates one example of a modification of a lens illustrated in FIG. 1.

Note that, in the present embodiment, the recessed portion 34 is formed on the rear face of the lens 32 of the high-beam unit 16, but the recessed portion 34 may be omitted in the lens 32 as illustrated in FIG. 5. In this case, for example, the rear face of the lens 32 may be formed along a surface perpendicular to the front-rear direction, and the distal end of the light shielding wall 20 may be placed in proximity to the rear face of the lens. Further, in this case, the front surface of the upper lens portion 32A in the lens 32 may be formed in a curved shape protruding forward in a side view, and the front surface of the lower lens portion 32B in the lens 32 may be formed in a curved shape protruding forward in a side view.

Further, in the high-beam unit 16, the first light distribution portion 16A and the second light distribution portion 16B are arranged in the up-down direction, and the second light distribution portion 16B is placed on the lower side relative to the first light distribution portion 16A. Instead of this, the second light distribution portion 16B may be placed on the upper side relative to the first light distribution portion 16A. Further, the first light distribution portion 16A and the second light distribution portion 16B may be arranged in the vehicle width direction, and the second light distribution portion 16B may be placed on an inner side in the vehicle width direction or on an outer side in the vehicle width direction relative to the first light distribution portion 16A.

What is claimed is:

1. A vehicular headlamp comprising:
a first light distribution portion including a first light source, the first light distribution portion being configured to distribute, toward a vehicle front side, light projected by the first light source;
a second light distribution portion including a second light source, reflecting mirror, and an micro electro mechanical system mirror, the second light distribution portion being configured to distribute light toward the vehicle front side with a predetermined light distribution pattern by reflecting, by the micro electro mechanical system mirror, light from the reflecting mirror projected by the second light source;
a holding member configured to hold the first light source, the second light source, and the micro electro mechanical system mirror;
a single lens including a first lens portion and a second lens portion, the first lens portion being constituting a vehicle-front-side portion of the first light distribution portion and configured such that the light projected by the first light source is passed through the first lens portion, the second lens portion being constituting a vehicle-front-side portion of the second light distribution portion and configured such that the light reflected by the micro electro mechanical system mirror is passed through the second lens portion;
a separating wall formed in the holding member so as to protrude toward the vehicle front side relative to the holding member, the separating wall being configured to separate a region between the first lens portion and the holding member from a region between the second lens portion and the holding member;
a lens hold portion that holds the lens, a lower portion of the lens hold portion connected to the reflecting mirror.

2. The vehicular headlamp according to claim 1, wherein:
the lens includes a recessed portion formed on a rear face of the lens such that the recessed portion is opened toward a vehicle rear side; and
a front end of the separating wall is placed inside the recessed portion.

3. The vehicular headlamp according to claim 1, wherein:
a surface of the separating wall on a side of the second light distribution portion is a light absorption portion configured to absorb the light reflected by the micro electro mechanical system minor.

4. The vehicular headlamp according to claim 1, wherein the holding member is provided as a heat sink configured to dissipate heat generated by the first light source and the second light source.

5. The vehicular headlamp according to claim 1, wherein:
the first light distribution portion and the second light distribution portion are arranged in a vehicle up-down direction; and
the second light distribution portion is placed on a vehicle lower side relative to the first light distribution portion.

6. The vehicular headlamp according to claim 1, wherein:
the micro electro mechanical system mirror is constituted by a plurality of micromovable mirrors arranged two-dimensionally; and
each of the micromovable mirrors is configured to be changeable between an ON state in which each of the micromovable mirrors projects reflection light toward the vehicle front side and an OFF state in which each of the micromovable mirrors projects the reflection light toward the separating wall.

7. The vehicular headlamp according to claim I, wherein:
the second light distribution portion includes a reflection portion provided on the vehicle front side relative to the second light source and configured to reflect the light projected by the second light source so that the reflected light is incident on the micro electro mechanical system minor.

8. The vehicular headlamp according to claim 2, wherein:
a rear face of the first lens portion is configured to protrude toward a rear side relative to a bottom face of the recessed portion so as to collect the light projected by the first light source; and
a rear face of the second lens portion is configured to protrude toward the rear side relative to the bottom face of the recessed portion so as to collect the light reflected by the micro electro mechanical system mirror.

9. A vehicular headlamp comprising:
a first light distribution portion including a first light source, the first light distribution portion being configured to distribute, toward a vehicle front side, light projected by the first light source;
a second light distribution portion including a second light source and an micro electro mechanical system mirror, the second light distribution portion being configured to distribute light toward the vehicle front side with a predetermined light distribution pattern by reflecting, by the micro electro mechanical system mirror, light projected by the second light source;
a holding member configured to hold the first light source, the second light source, and the micro electro mechanical system mirror;
a single lens including a first lens portion and a second lens portion, the first lens portion being constituting a vehicle-front-side portion of the first, light distribution portion and configured such that the light projected by the first light source is passed through the first lens portion, the second lens portion being constituting a vehicle-front-side portion of the second light distribution portion and configured such that the light reflected by the micro electro mechanical system mirror is passed through the second lens portion;

a separating wall formed in the holding member so as to protrude toward the vehicle front side relative to the holding member, the separating wall being configured to separate a region between the first lens portion and the holding member from a region between the second lens portion and the holding member;

the lens includes a recessed portion formed on a rear face of the lens such that the recessed portion is opened toward a vehicle rear side;

a front end of the separating wall is placed inside the recessed portion;

a rear face of the first lens portion is configured to protrude toward a rear side relative to a bottom face of the recessed portion so as to collect the light projected by the first light source; and a rear face of the second lens portion is configured to protrude toward the rear side relative to the bottom face of the recessed portion so as to collect the light reflected by the micro electro mechanical system mirror.

* * * * *